United States Patent
Li et al.

(10) Patent No.: US 12,145,607 B2
(45) Date of Patent: Nov. 19, 2024

(54) AUTONOMOUS DRIVING CONTROL SYSTEM AND CONTROL METHOD AND DEVICE

(71) Applicants: ZHEJIANG GEELY HOLDING GROUP CO., LTD, Zhejiang (CN); ZHEJIANG GEELY AUTOMOBILE RESEARCH INSTITUTE CO., LTD, Zhejiang (CN)

(72) Inventors: Bo Li, Ningbo (CN); Xuefeng Li, Ningbo (CN)

(73) Assignees: ZHEJIANG GEELY HOLDING GROUP CO., LTD, Hangzhou (CN); ZHEJIANG GEELY AUTOMOBILE RESEARCH INSTITUTE CO., LTD, Taizhou (CN)

( * ) Notice: Subject to any disclaimer, the term of this patent is extended or adjusted under 35 U.S.C. 154(b) by 289 days.

(21) Appl. No.: 17/846,292

(22) Filed: Jun. 22, 2022

(65) Prior Publication Data

US 2022/0315021 A1 Oct. 6, 2022

Related U.S. Application Data

(63) Continuation-in-part of application No. PCT/CN2020/115796, filed on Sep. 17, 2020.

(30) Foreign Application Priority Data

Dec. 23, 2019 (CN) .......................... 201911336519.6

(51) Int. Cl.
*B60W 50/029* (2012.01)
*B60W 10/18* (2012.01)
(Continued)

(52) U.S. Cl.
CPC .......... *B60W 50/029* (2013.01); *B60W 10/18* (2013.01); *B60W 10/20* (2013.01); *B60W 60/0015* (2020.02); *B60W 2050/0292* (2013.01)

(58) Field of Classification Search
CPC .... B60W 50/029; B60W 10/18; B60W 10/20; B60W 60/0015; B60W 2050/0292; B60W 50/023; G05D 1/0077
See application file for complete search history.

(56) References Cited

U.S. PATENT DOCUMENTS

| | | | |
|---|---|---|---|
| 11,914,489 B2* | 2/2024 | Lambrecht | .......... G06F 11/2005 |
| 2001/0056304 A1* | 12/2001 | Nitta | .................. G05B 19/0428 |
| | | | 700/21 |

(Continued)

FOREIGN PATENT DOCUMENTS

| CN | 101430560 A | 5/2009 |
|---|---|---|
| CN | 107407910 A | 11/2017 |

(Continued)

OTHER PUBLICATIONS

International Search Report and Written Opinion for PCT/CN2020/115796 (ISA/CN) mailed Dec. 16, 2020 (12 pages).

(Continued)

*Primary Examiner* — Rami Khatib
(74) *Attorney, Agent, or Firm* — Westbridge IP LLC

(57) ABSTRACT

An autonomous driving control system comprises a main controller, a backup controller, main execution apparatuses and backup execution apparatuses. The backup controller is configured to decompose, when receiving a main control instruction from the main controller, the main control instruction to obtain backup control instructions corresponding to the backup execution apparatuses respectively, and send the backup control instructions to the backup execution apparatuses correspondingly; and the control system is con- (Continued)

figured to control, when detecting that an abnormality occurs in any one device of the main execution apparatuses, the backup execution apparatus corresponding to the device in which the abnormality has occurred to execute a corresponding backup control instruction. The system can solve the problem that an autonomous driving control system cannot operate normally when any controller or actuation mechanism fails at a single point.

8 Claims, 4 Drawing Sheets

(51) Int. Cl.
*B60W 10/20* (2006.01)
*B60W 60/00* (2020.01)

(56) References Cited

U.S. PATENT DOCUMENTS

| 2004/0064220 | A1* | 4/2004 | Kobayashi | B60T 8/321 |
| | | | | 701/1 |
| 2016/0034363 | A1 | 2/2016 | Poledna | |
| 2019/0361439 | A1* | 11/2019 | Zeng | G06V 20/56 |
| 2021/0070312 | A1* | 3/2021 | Decius | B60W 50/04 |
| 2021/0163026 | A1* | 6/2021 | Ochida | B60W 60/0015 |
| 2023/0011677 | A1* | 1/2023 | Li | H04L 69/40 |

FOREIGN PATENT DOCUMENTS

| CN | 109917779 A | 6/2019 |
| CN | 110077420 A | 8/2019 |
| CN | 110235358 A | 9/2019 |
| CN | 110682920 A | 1/2020 |
| CN | 110745144 A | 2/2020 |
| WO | WO 2018220811 A1 | 12/2018 |

OTHER PUBLICATIONS

1$^{st}$ Office Action for China Application No. 201911336519.6 dated Feb. 13, 2020 (3 pages).
2$^{nd}$ Office Action for China Application No. 201911336519.6 dated Mar. 10, 2020 (5 pages).

* cited by examiner

AUTONOMOUS DRIVING CONTROL SYSTEM AND CONTROL METHOD AND DEVICE

CROSS-REFERENCE TO RELATED APPLICATIONS

This application is a continuation-in-part of International Application No. PCT/CN2020/115796 filed Sep. 17, 2020, which claims priority to Chinese Patent Application No. 201911336519.6 filed on Dec. 23, 2019, and entitled "AUTONOMOUS DRIVING CONTROL SYSTEM AND CONTROL METHOD AND DEVICE", which are each incorporated herein by reference in their entirety.

FIELD OF THE INVENTION

The present invention relates to autonomous driving, and in particular to an autonomous driving control system and a control method and device.

BACKGROUND OF THE INVENTION

Automobiles are developing in four areas: automation, networking, electrification and sharing, where the autonomous driving technology is the top priority in the current development of the automotive industry, which not only has a huge impact on the development of the industry, but also leads a major change in the future travel model.

In the future, in order to further achieve highly autonomous driving systems of L3 and L4 levels, the reliability of the systems needs to be improved comprehensively, which places higher requirements on perception, decision-making and execution systems as well as software and hardware devices. The backup redundancy of a controller and an actuation mechanism is indispensable to achieving highly autonomous driving.

The highly autonomous driving of L3 and L4 levels requires a higher reliability to perform a driving task in order to free a driver from the driving task and provide the driver with an Eyes-Off and Minds-Off driving experience. In order to achieve such a system with a high reliability, the controller and the actuation mechanism need to achieve an Automotive Safety Integration Level (ASIL) D-level functional safety and reliability, whereas an existing autonomous driving system with a single Electric Control Unit (ECU) and architecture cannot achieve the ASIL D-level functional safety and reliability.

BRIEF DESCRIPTION OF THE INVENTION

For the above problem of the prior art, an object of the present invention is to provide an autonomous driving control system and a control method and device, so as to solve the problem that an existing single-architecture autonomous driving system cannot operate normally when any controller or actuation mechanism fails at a single point.

A first aspect of the present invention provides an autonomous driving control system. The control system includes a control apparatus and an execution apparatus, the control apparatus including a main controller and a backup controller, the execution apparatus at least including a steering actuation mechanism and a braking actuation mechanism, the steering actuation mechanism at least including a main steering controller and a backup steering controller, and the braking actuation mechanism at least including a main braking controller and a backup braking controller, wherein the backup controller is configured to decompose, when receiving a main control instruction, the main control instruction to obtain a backup steering control instruction and a backup braking control instruction, send the backup steering control instruction to the steering actuation mechanism, and send the backup braking control instruction to the braking actuation mechanism; and the control system is configured to control, when detecting that an abnormality occurs in any one device of the main controller, the main steering controller and the main braking controller, the steering actuation mechanism to execute the backup steering control instruction, and control the braking actuation mechanism to execute the backup braking control instruction.

Further, the main steering controller is configured to send, when the control system detects that the abnormality occurs in any one device of the main controller, the main steering controller and the main braking controller, a first response control instruction to the backup steering controller, the first response control instruction being used for instructing the backup steering controller to respond to the backup steering control instruction; and the main braking controller is configured to send, when the control system detects that the abnormality occurs in any one device of the main controller, the main steering controller and the main braking controller, a second response control instruction to the backup braking controller, the second response control instruction being used for instructing the backup braking controller to respond to the backup braking control instruction.

Further, the backup steering controller is configured to respond to, when not receiving a control instruction of the main steering controller in a preset period, the backup steering control instruction; and the backup braking controller is configured to respond to, when not receiving a response instruction of the main braking controller in a preset period, the backup braking control instruction.

Further, the backup steering controller is configured to respond to, when detecting that communication with the main steering controller is interrupted, the backup steering control instruction; and the backup braking controller is configured to respond to, when detecting that communication with the main braking controller is interrupted, the backup braking control instruction.

Further, the control system is specifically configured to detect whether a failure occurs in any one device of the main controller, the main steering controller and the main braking controller, or whether communication interruption occurs in any one device of the main controller, the main steering controller and the main braking controller.

Further, the main steering controller is further configured to send, when the control system detects that the abnormality occurs in any one device of the main controller, the main steering controller and the main braking controller, the first response control instruction to the backup steering controller on the basis of a preset abnormal trigger condition; and the main braking controller is further configured to send, when the control system detects that the abnormality occurs in any one device of the main controller, the main steering controller and the main braking controller, the second response control instruction to the backup braking controller on the basis of the preset abnormal trigger condition, the second response control instruction being used for instructing the backup braking controller to respond to the backup braking control instruction.

A second aspect of the present invention provides a control method for an autonomous driving control system. The control system includes a control apparatus and an execution apparatus, the control apparatus including a main controller and a backup controller, and the execution apparatus including a main execution apparatus and a backup execution apparatus. The method includes: receiving, by the backup execution apparatus, a main control instruction forwarded by the backup controller; detecting, by the backup execution apparatus, whether an abnormality occurs in any one device of the main controller and the main execution apparatus; and when the abnormality occurs in any one device of the main controller and the main execution apparatus, executing, by the backup execution apparatus, the main control instruction.

Further, detecting, by the backup execution apparatus, whether an abnormality occurs in any one device of the main controller and the main execution apparatus includes: determining, by the backup execution apparatus, whether a response control instruction sent by the main execution apparatus is received, wherein the response control instruction is sent, when the control system detects that the abnormality occurs in any one device of the main controller or the main execution apparatus, by the main execution apparatus to instruct the backup execution apparatus to respond to the backup control instruction; or, determining, by the backup execution apparatus, whether interrupted communication with the main execution apparatus occurs; or, whether a control instruction of the main execution apparatus is received by the backup execution apparatus in a preset period.

A third aspect of the present invention provides a control method for an autonomous driving control system. The control system includes a control apparatus and an execution apparatus, the control apparatus including a main controller and a backup controller, and the execution apparatus including a main execution apparatus and a backup execution apparatus. The method includes: detecting, by the main execution apparatus, whether an abnormality occurs in any one device of the main controller and the main execution apparatus; and when the abnormality occurs in any one device of the main controller and the main execution apparatus, sending, by the main execution apparatus, a response control instruction to the backup execution apparatus, such that the backup execution apparatus executes, on the basis of the response control instruction, the backup control instruction.

A fourth aspect of the present invention provides an autonomous driving control system. The control system includes a control apparatus and an execution apparatus, the control apparatus including a main controller and a backup controller, the execution apparatus including main execution apparatuses and backup execution apparatuses, the main execution apparatuses at least including a main steering controller and a main braking controller, and the backup execution apparatuses at least including a backup steering controller corresponding to the main steering controller and a backup braking controller corresponding to the main braking controller, wherein the backup controller is configured to decompose, when receiving a main control instruction from the main controller, the main control instruction to obtain backup control instructions corresponding to the backup execution apparatuses respectively, and send the backup control instructions to the backup execution apparatuses correspondingly; and the control system is configured to control, when detecting that an abnormality occurs in any one device of the main execution apparatuses, the backup execution apparatus corresponding to the device in which the abnormality has occurred to execute a corresponding backup control instruction.

Further, the backup control instructions include a backup steering control instruction and a backup braking control instruction; and the backup controller is further configured to send the backup steering control instruction to the backup steering controller, and send the backup braking control instruction to the backup braking controller.

Further, the main steering controller is configured to send, when the control system detects that an abnormality occurs in any one device of the main controller and the main steering controller, a first response control instruction to the backup steering controller, the first response control instruction being used for instructing the backup steering controller to respond to the backup steering control instruction; and the main braking controller is configured to send, when the control system detects that an abnormality occurs in any one device of the main controller and the main braking controller, a second response control instruction to the backup braking controller, the second response control instruction being used for instructing the backup braking controller to respond to the backup braking control instruction.

Further, the backup steering controller is configured to respond to, when not receiving a control instruction of the main steering controller in a preset period, the backup steering control instruction; and the backup braking controller is configured to respond to, when not receiving a control instruction of the main braking controller in a preset period, the backup braking control instruction.

Further, the backup steering controller is configured to respond to, when detecting that communication with the main steering controller is interrupted, the backup steering control instruction; and the backup braking controller is configured to respond to, when detecting that communication with the main braking controller is interrupted, the backup braking control instruction.

Further, the control system is specifically configured to detect whether a failure occurs in any one device of the main controller, the main steering controller and the main braking controller, or whether communication interruption occurs in any one device of the main controller, the main steering controller and the main braking controller.

Further, the main steering controller is further configured to send, when the control system detects that the abnormality occurs in any one device of the main controller and the main steering controller, the first response control instruction to the backup steering controller on the basis of a preset abnormal trigger condition; and the main braking controller is further configured to send, when the control system detects that the abnormality occurs in any one device of the main controller and the main braking controller, the second response control instruction to the backup braking controller on the basis of the preset abnormal trigger condition, the second response control instruction being used for instructing the backup braking controller to respond to the backup braking control instruction.

A fifth aspect of the present invention provides control method for an autonomous driving control system. The control system includes a control apparatus and an execution apparatus, the control apparatus including a main controller and a backup controller, the execution apparatus including main execution apparatuses and backup execution apparatuses, the main execution apparatuses at least including a main steering controller and a main braking controller, and the backup execution apparatuses at least including a backup steering controller corresponding to the main steering controller and a backup braking controller corresponding to the main braking controller. The control method includes: receiving, by the backup controller, a main control instruction sent by the main controller; decomposing, by the backup controller, the main control instruction to obtain backup control instructions corresponding to the backup execution apparatuses respectively; sending, by the backup controller, the backup control instructions to the backup execution apparatuses correspondingly; detecting, by the control system, whether an abnormality occurs in any one device of the main execution apparatuses; and controlling, by the control system when detecting the above abnormality, the backup execution apparatus corresponding to the device in which the abnormality has occurred to execute a corresponding backup control instruction.

Further, the backup control instructions include a backup steering control instruction and a backup braking control instruction; and the step of sending, by the backup controller, the backup control instructions to the backup execution apparatuses correspondingly includes:

sending, by the backup controller, the backup steering control instruction to the backup steering controller and the backup braking control instruction to the backup braking controller.

Further, the step of controlling, by the control system when detecting the above abnormality, the backup execution apparatus corresponding to the device in which the abnormality has occurred to execute a corresponding backup control instruction includes:

sending, by the main steering controller, when the control system detects that an abnormality occurs in any one device of the main controller and the main steering controller, a first response control instruction to the backup steering controller, the first response control instruction being used for instructing the backup steering controller to respond to the backup steering control instruction; executing, by the backup steering controller, the backup steering control instruction on the basis of the first response control instruction; sending, by the main braking controller, when the control system detects that an abnormality occurs in any one device of the main controller and the main braking controller, a second response control instruction to the backup braking controller, the second response control instruction being used for instructing the backup braking controller to respond to the backup braking control instruction; and executing, by the backup braking controller, the backup braking control instruction on the basis of the second response control instruction.

Further, the control method also includes:

detecting, by the backup steering controller, whether a control instruction of the main steering controller is received in a preset period; if not, responding to, by the backup steering controller, the backup steering control instruction; and detecting, by the backup braking controller, whether a control instruction of the main braking controller is received in a preset period; if not, responding to, by the backup braking controller, the backup braking control instruction.

Further, the control method also includes:

detecting, by the backup steering controller, whether communication with the main steering controller is interrupted; if so, responding to, by the backup steering controller, the backup steering control instruction; and detecting, by the backup braking controller, whether communication with the main braking controller is interrupted; if so, responding to, by the backup braking controller, the backup braking control instruction.

A sixth aspect of the present invention provides a control device for an autonomous driving control system, the device including: a processor and a memory, wherein the memory stores at least one instruction, at least one program, a code set or an instruction set, and the at least one instruction, the at least one program, the code set or the instruction set is loaded and executed by the processor to implement any one of the control methods for the autonomous driving control system.

Due to the above technical solutions, the present invention has the following advantageous effects:

the control system includes a control apparatus and an execution apparatus, the control apparatus including a main controller and a backup controller corresponding to the main controller, and the execution apparatus at least including a steering actuation mechanism and a braking actuation mechanism, wherein the steering actuation mechanism at least includes a main steering controller and a backup steering controller corresponding thereto, and the braking actuation mechanism at least includes a main braking controller and a backup braking controller corresponding thereto. The execution apparatus is defined to include main execution apparatuses and backup execution apparatuses, and thus the main execution apparatuses at least include the main steering controller and the main braking controller, and the backup execution apparatuses at least include the backup steering controller and the backup braking controller.

The autonomous driving control system of the present invention includes the main controller, the backup controller, the main steering controller, the backup steering controller, the main braking controller and the backup braking controller. In an implementation, when an abnormality occurs in any one device of the main controller, the main steering controller or the main braking controller, a backup steering control instruction is executed by the backup steering controller instead, and a backup braking control instruction is executed by the backup braking controller, thereby ensuring that an autonomous driving vehicle can still operate normally when the abnormality occurs in any one device of the main controller, the main steering controller or the main braking controller, achieving an ASIL D-level functional safety and reliability of autonomous driving.

In another implementation, when the abnormality occurs in any one device of the main execution apparatuses, a corresponding backup control instruction is executed by the backup execution apparatus corresponding to the device in which the abnormality has occurred, other main execution apparatuses can still respond to a main control instruction of the main controller. For example, when the abnormality occurs in the main steering controller, the backup steering controller will execute a corresponding backup control instruction, and the main braking controller may still respond to a main braking control instruction of the main controller to operate normally; and when the abnormality occurs in the main braking controller, the backup braking controller will execute a corresponding backup control instruction, and the main steering controller may still respond to a main steering control instruction of the main controller to operate normally, avoiding a situation that all the main execution apparatuses need to be switched to the backup execution apparatuses when the abnormality occurs in one main execution apparatus, thereby ensuring the timeliness and the precision of backup, and further ensuring the ASIL D-level functional safety and reliability of the autonomous driving.

BRIEF DESCRIPTION OF THE DRAWINGS

In order to illustrate the technical solutions of the present invention more clearly, the following is a brief description of the accompanying drawings that need to be used in the descriptions of the embodiments or the prior art. Apparently, the accompanying drawings in the following descriptions are only some embodiments of the present invention, and those of ordinary skill in the art may still obtain other drawings from these drawings without creative efforts.

DETAILED DESCRIPTION

In order to enable those skilled in the art to better understand the solutions of the present invention, the technical solutions in the embodiments of the present invention will be clearly and completely described below in conjunction with the accompanying drawings in the embodiments of the present invention. Apparently, the embodiments described are only part rather than all of the embodiments of the present invention. Based on the embodiments of the present invention, all other embodiments obtained by those of ordinary skill in the art without creative efforts shall fall within the protection scope of the present invention.

It should be noted that the terms "first", "second", and the like in the description, the claims, and the drawings of the present invention are used to distinguish between similar objects and not necessarily to describe a specific sequence or order. It should be understood that data so used are interchangeable under appropriate circumstances, such that the embodiments of the present invention described herein can be implemented in a sequence other than those illustrated or described herein. In addition, the terms "include" and "have" and any variations thereof are intended to cover a non-exclusive inclusion.

Figure 1:
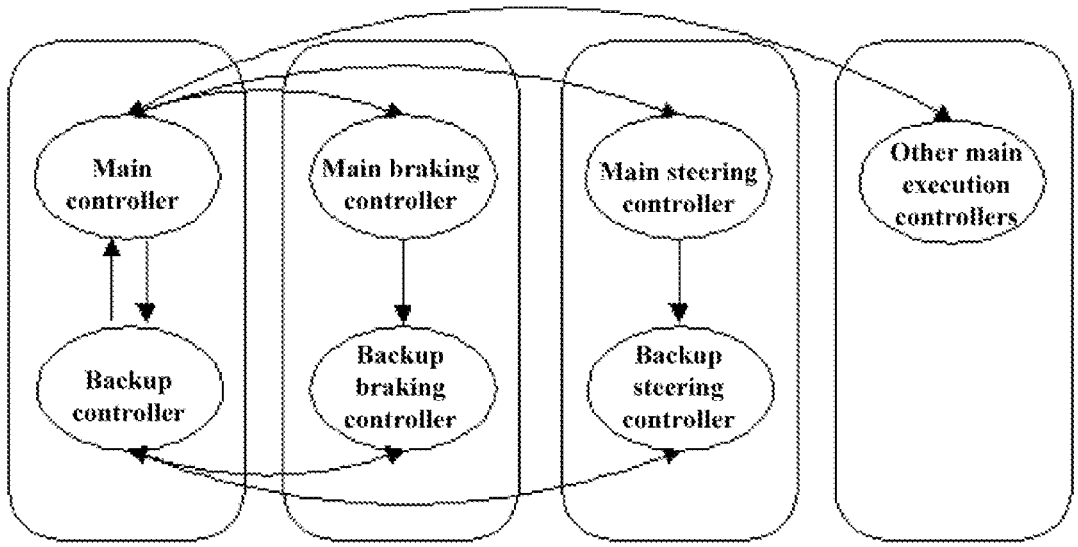
FIG. 1 is a schematic structural diagram of an autonomous driving control system provided by an embodiment of the present invention.

FIG. 1 is a schematic structural diagram of an autonomous driving control system provided by an embodiment of the present invention. As shown in FIG. 1, the autonomous driving control system includes a control apparatus and an execution apparatus, the control apparatus including a main controller and a backup controller, the execution apparatus at least including a steering actuation mechanism and a braking actuation mechanism, the steering actuation mechanism at least including a main steering controller and a backup steering controller, and the braking actuation mechanism at least including a main braking controller and a backup braking controller.

In some embodiments, the backup controller is configured to decompose, when receiving a main control instruction, the main control instruction to obtain a backup steering control instruction and a backup braking control instruction, send the backup steering control instruction to the steering actuation mechanism, and send the backup braking control instruction to the braking actuation mechanism; and the control system is configured to control, when detecting that an abnormality occurs in any one device of the main controller, the main steering controller and the main braking controller, the steering actuation mechanism to execute the backup steering control instruction, and/or control the braking actuation mechanism to execute the backup braking control instruction.

Alternatively, the execution apparatus may further include another actuation mechanism, wherein the another actuation mechanism may only include a main execution controller, or may include both a main execution controller and a backup execution controller (not shown in FIG. 1).

In a specific embodiment, in order to ensure that when the abnormality occurs in any one device of the main controller, the main steering controller and the main braking controller, the steering actuation mechanism and the braking actuation mechanism can execute the backup steering control instruction and the backup braking control instruction in time, the steering actuation mechanism and the braking actuation mechanism may be configured to start, when receiving a first response control instruction and a second response control instruction, to execute the backup steering control instruction and the backup braking control instruction, that is, the main steering controller is configured to send, when the control system detects that the abnormality occurs in any one device of the main controller, the main steering controller and the main braking controller, the first response control instruction to the backup steering controller, the first response control instruction being used for instructing the backup steering controller to respond to the backup steering control instruction;

the backup steering controller executes, on the basis of the first response control instruction, the backup steering control instruction;

the main braking controller is configured to send, when the control system detects that the abnormality occurs in any one device of the main controller, the main steering controller and the main braking controller, the second response control instruction to the backup braking controller, the second response control instruction being used for instructing the backup braking controller to respond to the backup braking control instruction; and the backup braking controller executes, on the basis of the second response control instruction, the backup braking control instruction.

The abnormality occurring in any one device of the main controller, the main steering controller and the main braking controller specifically includes: a failure of the main controller, a failure of the main steering controller, a failure of the main braking controller, communication interruption between the main controller and the main steering controller and communication interruption between the main controller and the main braking controller.

The first response control instruction and the second response control instruction may be different response control instructions, or may be same response control instructions.

The backup steering controller and the backup braking controller may preset an abnormal trigger condition, and, when the control system detects the abnormality, automatically send the first response control instruction and the second response control instruction, that is, the main steering controller is further configured to send, when the control system detects that the abnormality occurs in any one device of the main controller, the main steering controller and the main braking controller, the first response control instruction to the backup steering controller on the basis of the preset abnormal trigger condition; and the main braking controller is further configured to send, when the control system detects that the abnormality occurs in any one device of the main controller, the main steering controller and the main braking controller, the second response control instruction to the backup braking controller on the basis of the preset abnormal trigger condition, the second response control instruction being used for instructing the backup braking controller to respond to the backup braking control instruction.

In the foregoing embodiments, when the abnormality occurs in any one device of the main controller, the main steering controller and the main braking controller, the backup steering control instruction is executed by the backup steering controller instead, and the backup braking control instruction is executed by the backup braking controller, that is, all main execution controllers are switched to backup execution controllers, thereby ensuring that an autonomous driving vehicle can still operate normally when the abnormality occurs in any one device of the main controller, the main steering controller or the main braking controller.

In some other embodiments, when an abnormality occurs in one of the main execution controllers, only the abnormal main execution controller may need to be switched to the corresponding backup execution controller.

For convenience of description, the execution apparatus is divided into main execution apparatuses and backup execution apparatuses, wherein the main execution apparatuses at least include the main steering controller and the main braking controller, and the backup execution apparatuses at least include the backup steering controller corresponding to the main steering controller and the backup braking controller corresponding to the main braking controller. Of course, optionally, the main execution apparatuses may further include other main execution controllers, and the backup execution apparatuses may also include other backup execution controllers (not shown in FIG. 1) corresponding to the other main execution controllers. The main controller sends corresponding main control instructions to the backup controller and each main execution apparatus.

The backup controller is configured to decompose, when receiving a main control instruction from the main controller, the main control instruction to obtain backup control instructions corresponding to the backup execution apparatuses respectively, and send the backup control instructions to the backup execution apparatuses correspondingly; and the control system is configured to control, when detecting that an abnormality occurs in any one device of the main execution apparatuses, the backup execution apparatus corresponding to the device in which the abnormality has occurred to execute a corresponding backup control instruction.

In a specific embodiment, the backup control instructions include a backup steering control instruction and a backup braking control instruction. Correspondingly, the backup controller is further configured to decompose, when receiving the main control instruction from the main controller, the main control instruction to obtain the backup steering control instruction corresponding to the backup steering controller and the backup braking control instruction corresponding to the backup braking controller, and send the backup steering control instruction to the backup steering controller, and send the backup braking control instruction to the backup braking controller. Of course, in the presence of other main execution controllers and the corresponding other backup execution controllers, the backup controller can also decompose the main control instruction to obtain backup control instructions corresponding to the other backup execution controllers, and send the backup control instructions to the other backup execution controllers.

In such embodiments, when the abnormality occurs in any one device of the main execution apparatuses, a corresponding backup control instruction is executed by the backup execution apparatus corresponding to the device in which the abnormality has occurred, other main execution apparatuses can still respond to a main control instruction of the main controller. For example, when the abnormality occurs in the main steering controller, the backup steering controller will execute the corresponding backup steering control instruction, and the main braking controller may still respond to a main braking control instruction of the main controller to operate normally; and when the abnormality occurs in the main braking controller, the backup braking controller will execute the corresponding backup braking control instruction, and the main steering controller may still respond to a main steering control instruction of the main controller to operate normally. In this way, it is avoided that all the main execution apparatuses need to be switched to the backup execution apparatuses when the abnormality occurs in one main execution apparatus, thereby ensuring the timeliness and the precision of backup, and further ensuring the ASIL D-level functional safety and reliability of the autonomous driving.

In addition, when an abnormality occurs in the main controller, the backup controller will take place of the main controller to execute the operation of the main controller, and each backup execution apparatus will execute a respective backup control instruction.

In a specific embodiment, in order to ensure that when an abnormality occurs in any one device of the main controller, the main steering controller and the main braking controller, the corresponding backup execution apparatus can execute the backup control instruction in time, the backup steering controller may be configured to start, when receiving a first response control instruction, to execute the backup steering control instruction, and the backup braking controller may be configured to start, when receiving a second response control instruction, to execute the backup braking control instruction.

Specifically, the main steering controller is configured to send, when the control system detects that an abnormality occurs in any one device of the main controller and the main steering controller, the first response control instruction to the backup steering controller, the first response control instruction being used for instructing the backup steering controller to respond to the backup steering control instruction. The backup steering controller executes the backup steering control instruction on the basis of the first response control instruction.

The main braking controller is configured to send, when the control system detects that an abnormality occurs in any one device of the main controller and the main braking controller, the second response control instruction to the backup braking controller, the second response control instruction being used for instructing the backup braking controller to respond to the backup braking control instruction. The backup braking controller executes the backup braking control instruction on the basis of the second response control instruction.

In other words, when an abnormality occurs in the main steering controller, the first response control instruction is sent to the backup steering controller, so that the backup steering controller executes the backup steering control instruction on the basis of the first response control instruction. When an abnormality occurs in the main braking controller, the second response control instruction is sent to the backup braking controller, so that the backup braking controller executes the backup braking control instruction on the basis of the second response control instruction. When an abnormality occurs in the main controller, the first response control instruction and the second response control instruction are sent to the backup steering controller and the backup braking controller respectively, so that the backup steering controller and the backup braking controller execute the backup steering control instruction and the backup braking control instruction respectively.

The abnormality occurring in any one device of the main controller, the main steering controller and the main braking controller specifically includes: a failure of the main controller, a failure of the main steering controller, a failure of the main braking controller, communication interruption between the main controller and the main steering controller or communication interruption between the main controller and the main braking controller.

The first response control instruction and the second response control instruction may be different response control instructions, or may be same response control instructions.

In some embodiments, the main steering controller and the main braking controller may preset an abnormal trigger condition, and, when the control system detects the abnormality, automatically send the first response control instruction and the second response control instruction.

Specifically, the main steering controller is further configured to send, when the control system detects that the abnormality occurs in any one device of the main controller and the main steering controller, the first response control instruction to the backup steering controller on the basis of a preset abnormal trigger condition; and the main braking controller is further configured to send, when the control system detects that the abnormality occurs in any one device of the main controller and the main braking controller, the second response control instruction to the backup braking controller on the basis of the preset abnormal trigger condition, the second response control instruction being used for instructing the backup braking controller to respond to the backup braking control instruction.

In addition, the main steering controller and the main braking controller are not limited to sending the response control instructions to the corresponding backup steering controller and the backup braking controller when the control system detects the abnormality, but can further send the response control instructions to the corresponding backup steering controller and the backup braking controller according to a preset trigger condition, that is, the main steering controller is configured to send, on the basis of the preset trigger condition of response instruction, the first response control instruction to the backup steering controller, the first response control instruction being used for instructing the backup steering controller to respond to the backup steering control instruction; and the main braking controller is configured to send, on the basis of the preset trigger condition of response instruction, the second response control instruction to the backup braking controller, the second response control instruction being used for instructing the backup braking controller to respond to the backup braking control instruction.

In a specific embodiment, since there is real-time communication between the backup steering controller and the main steering controller and between the backup braking controller and the main braking controller during a preset period, in order to avoid communication interruption between the backup steering controller and the main steering controller or between the backup braking controller and the main braking controller causing the backup steering controller to be unable to execute the backup steering control instruction in time, or causing the backup braking controller to be unable to execute the backup braking control instruction in time, the backup steering controller and the backup braking controller may be further configured to start, when not receiving corresponding control instructions of the main steering controller and the main braking controller in a preset period, to execute the backup steering control instruction and the backup braking control instruction, that is, the backup steering controller is configured to respond to, when not receiving the control instruction of the main steering controller in the preset period, the backup steering control instruction; and the backup braking controller is configured to respond to, when not receiving the control instruction of the main braking controller in the preset period, the backup braking control instruction.

In a specific embodiment, in order to avoid communication interruption between the backup steering controller and the main steering controller or between the backup braking controller and the main braking controller causing the backup steering controller to be unable to execute the backup steering control instruction in time, or causing the backup braking controller to be unable to execute the backup braking control instruction in time, the backup steering controller and the backup braking controller may be further configured to start, when detecting that communication with the corresponding main steering controller and the main braking controller is interrupted, to execute the backup steering control instruction and the backup braking control instruction, that is, the backup steering controller is configured to respond to, when detecting that the communication with the main steering controller is interrupted, the backup steering control instruction; and the backup braking controller is configured to respond to, when detecting that the communication with the main braking controller is interrupted, the backup braking control instruction.

In other embodiments, considering that when communication with the main controller is lost, the backup controller cannot receive the main control instruction, in order to ensure that the backup controller may calculate the backup control instruction in time, the backup controller may be further configured to detect whether the communication between the backup controller and the main controller is interrupted, and when the communication therebetween is interrupted, the backup controller autonomously generates the backup control instruction and decomposes same.

In other embodiments, considering that when any module in the control system fails at a single point, the safety of an autonomous driving vehicle will be decreased, and in order to ensure a safe driving, the control system may be further configured to determine whether the abnormality occurs in any one device of the system;

if so, the control system sends a takeover instruction to a driver of a current vehicle and/or starts a safe parking procedure.

Figure 2:
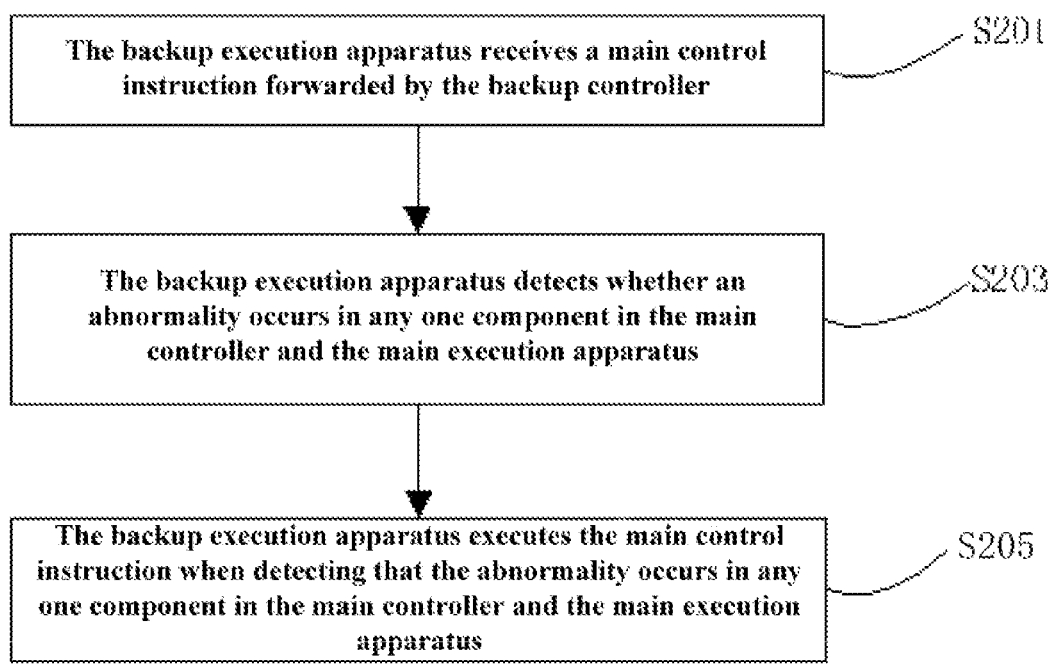
FIG. 2 is a schematic flowchart of a control method for an autonomous driving control system with a backup execution apparatus as an execution subject provided by an embodiment of the present invention.

A control method for an autonomous driving control system of the present invention will be described below with a backup execution apparatus as an execution subject. FIG. 2 is a schematic flowchart of a control method for an autonomous driving control system provided by an embodiment of the present invention. The specification provides operation steps of the method as described in the embodiments or the flowchart, but may include more or fewer operation steps based on conventional or uncreative labor. The sequence of steps listed in the embodiments is only one of many execution sequences of steps and does not represent the only execution sequence. In an actual execution of a product of an autonomous driving control apparatus, it may be executed sequentially or in parallel (for example, a parallel processor or multi-threaded processing environment) according to the methods shown in the embodiments or the accompanying drawings. Specifically as shown in FIG. 1, the control system includes a control apparatus and an execution apparatus, the control apparatus including a main controller and a backup controller, and the execution apparatus including a main execution apparatus and a backup execution apparatus. Specifically as shown in FIG. 2, the method may include:

step S201: the backup execution apparatus receives a main control instruction forwarded by the backup controller;

step S203: the backup execution apparatus detects whether an abnormality occurs in any one device of the main controller and the main execution apparatus; and step S205: the backup execution apparatus executes the main control instruction when detecting that the abnormality occurs in any one device of the main controller and the main execution apparatus.

In the embodiments of the present invention, the main execution apparatus may be a main steering controller, and correspondingly, the backup execution apparatus may be a backup steering controller; and the main execution apparatus may further be a main braking controller, and correspondingly, the backup execution apparatus may be a backup braking controller.

The main control instruction may be a control instruction generated by the main controller and used for controlling the main execution apparatus to execute functions of the main execution apparatus, for example, when the main execution apparatus is the main steering controller, the main control instruction may be a control instruction generated by the main controller and used for controlling the main steering controller to execute a steering function; and when the main execution apparatus is the main braking controller, the main control instruction may be a control instruction generated by the main controller and used for controlling the main braking controller to execute a braking function.

In the embodiments of the present invention, that the backup execution apparatus detects whether an abnormality occurs in any one device of the main controller and the main execution apparatus may include:

the backup execution apparatus determines whether a response control instruction sent by the main execution apparatus is received, wherein the response control instruction is sent, when the control system detects that the abnormality occurs in any one device of the main controller and the main execution apparatus, by the main execution apparatus to instruct the backup execution apparatus to respond to the backup control instruction; or, the backup execution apparatus determines whether communication with the main execution apparatus is interrupted; or, whether a control instruction of the main execution apparatus is received by the backup execution apparatus in a preset period.

In the embodiments of the present invention, when the backup execution apparatus detects that the abnormality occurs in any one device of the main controller and the main execution apparatus, the backup execution apparatus executes the main control instruction received thereby.

For example, when the backup execution apparatus is the backup steering controller, then when detecting that the abnormality occurs in any one device of the main controller or the main steering controller, the backup steering controller executes the main control instruction received thereby; and when the backup execution apparatus is the backup braking controller, then when detecting that the abnormality occurs in any one device of the main controller or the main braking controller, the backup braking controller executes the main control instruction received thereby.

Figure 3:
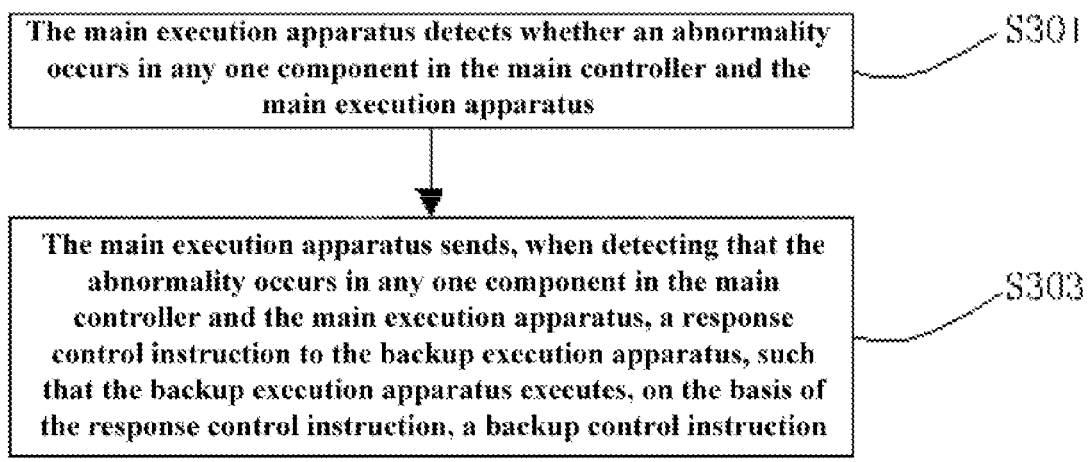
FIG. 3 is a schematic flowchart of a control method for an autonomous driving control system with a main execution apparatus as an execution subject provided by an embodiment of the present invention.

A control method for an autonomous driving control system of the present invention will be described below with a main execution apparatus as an execution subject. FIG. 3 is a schematic flowchart of a control method for an autonomous driving control system provided by an embodiment of the present invention. The specification provides operation steps of the method as described in the embodiments or the flowchart, but may include more or fewer operation steps based on conventional or uncreative labor. The sequence of steps listed in the embodiments is only one of many execution sequences of steps and does not represent the only execution sequence. In an actual execution of a product of an autonomous driving control apparatus, it may be executed sequentially or in parallel (for example, a parallel processor or multi-threaded processing environment) according to the methods shown in the embodiments or the accompanying drawings. Specifically as shown in FIG. 1, the control system includes a control apparatus and an execution apparatus, the control apparatus including a main controller and a backup controller, and the execution apparatus including a main execution apparatus and a backup execution apparatus. Specifically as shown in FIG. 3, the method may include:

step S301: the main execution apparatus detects whether an abnormality occurs in any one device of the main controller and the main execution apparatus;

step S303: the main execution apparatus sends, when detecting that the abnormality occurs in any one device of the main controller and the main execution apparatus, a response control instruction to the backup execution apparatus, such that the backup execution apparatus executes, on the basis of the response control instruction, a backup control instruction.

In the embodiments of the present invention, the main execution apparatus may include a monitor used for detecting whether the main controller and the main execution apparatus are abnormal, wherein the monitor may be located inside the main execution apparatus, or may be arranged in parallel with the main execution apparatus.

In the embodiments of the present invention, the abnormality occurring in any one device of the main controller and the main execution apparatus specifically includes: a failure of the main controller, a failure of the main execution apparatus, and communication interruption between the main controller and the main execution apparatus.

The main execution apparatus may be a main steering controller or a main braking controller, and the backup execution apparatus may be a backup steering controller or a backup braking controller.

The backup control instruction may be a main control instruction generated by the main controller and forwarded by the backup controller, or may be a control instruction autonomously generated by the backup controller.

Figure 4:
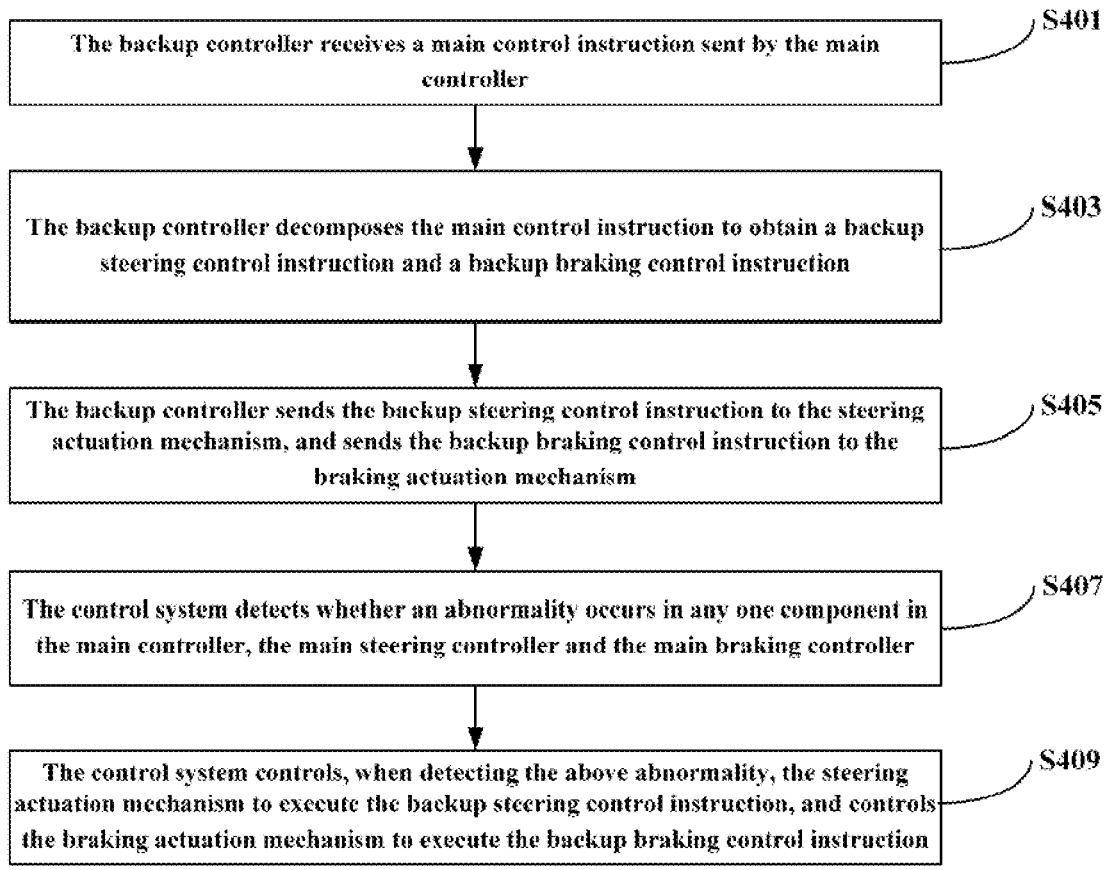
FIG. 4 is a schematic flowchart of a control method for an autonomous driving control system provided by an embodiment of the present invention.

A control method for an autonomous driving control system will be described below. FIG. 4 is a schematic flowchart of a control method for an autonomous driving control system provided by an embodiment of the present invention. The specification provides operation steps of the method as described in the embodiments or the flowchart, but may include more or fewer operation steps based on conventional or uncreative labor. The sequence of steps listed in the embodiments is only one of many execution sequences of steps and does not represent the only execution sequence. In an actual execution of a product of an autonomous driving control apparatus, it may be executed sequentially or in parallel (for example, a parallel processor or multi-threaded processing environment) according to the methods shown in the embodiments or the accompanying drawings. Specifically as shown in FIG. 1, the autonomous driving control system includes a control apparatus and an execution apparatus, the control apparatus including a main controller and a backup controller, and the execution apparatus at least including a steering actuation mechanism and a braking actuation mechanism, where the steering actuation mechanism at least includes a main steering controller and a backup steering controller, and the braking actuation mechanism at least includes a main braking controller and a backup braking controller. Specifically as shown in FIG. 4, the method may include:

- step S401: the backup controller receives a main control instruction sent by the main controller;
- step S403: the backup controller decomposes the main control instruction to obtain a backup steering control instruction and a backup braking control instruction;
- step S405: the backup controller sends the backup steering control instruction to the steering actuation mechanism, and sends the backup braking control instruction to the braking actuation mechanism;
- step S407: the control system detects whether an abnormality occurs in any one device of the main controller, the main steering controller and the main braking controller; and
- step S409: the control system controls, when detecting the above abnormality, the steering actuation mechanism to execute the backup steering control instruction, and controls the braking actuation mechanism to execute the backup braking control instruction.

In a specific embodiment, that the control system controls, when detecting the above abnormality, the steering actuation mechanism to execute the backup steering control instruction, and controls the braking actuation mechanism to execute the backup braking control instruction may include:

when the control system detects that the abnormality occurs in any one device of the main controller, the main steering controller and the main braking controller, the main steering controller sends a first response control instruction to the backup steering controller, the first response control instruction being used for instructing the backup steering controller to respond to the backup steering control instruction;

the backup steering controller executes the backup steering control instruction on the basis of the first response control instruction;

the main braking controller sends a second response control instruction to the backup braking controller, the second response control instruction being used for instructing the backup braking controller to respond to the backup braking control instruction; and the backup braking controller executes the backup braking control instruction on the basis of the second response control instruction.

In other embodiments, the control method may further include:

the backup steering controller detects whether a control instruction of the main steering controller is received in a preset period;

if not, the backup steering controller responds to the backup steering control instruction; and the backup braking controller detects whether a control instruction of the main braking controller is received in a preset period;

if not, the backup braking controller responds to the backup braking control instruction.

In other embodiments, the control method may further include:

the backup steering controller detects whether communication with the main steering controller is interrupted;

if so, the backup steering controller responds to the backup steering control instruction; and the backup braking controller detects whether communication with the main braking controller is interrupted;

if so, the backup braking controller responds to the backup braking control instruction.

Figure 5:
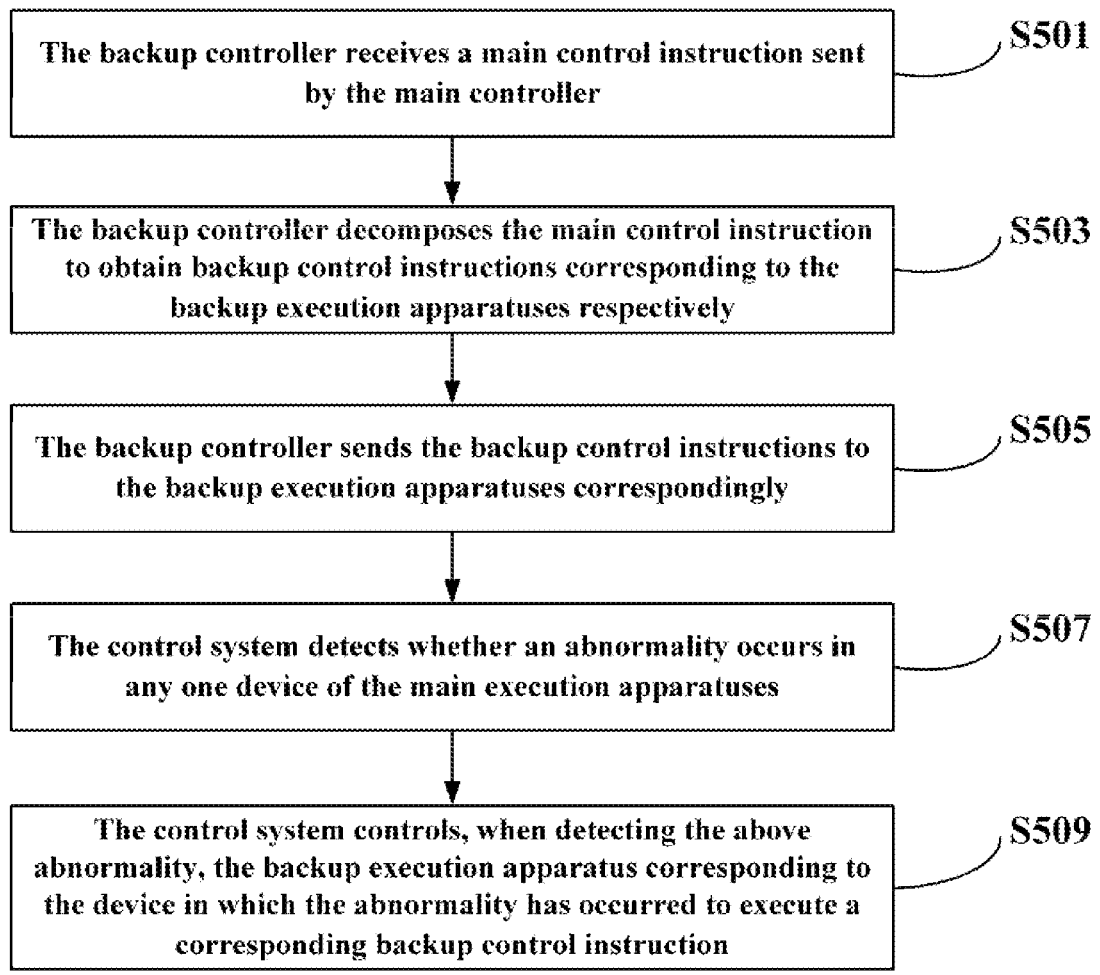
FIG. 5 is a schematic flowchart of a control method for an autonomous driving control system provided by another embodiment of the present invention.

Another control method for an autonomous driving control system provided by the present invention will be described below. FIG. 5 is a schematic flowchart of a control method for an autonomous driving control system provided by another embodiment of the present invention. The specification provides operation steps of the method as described in the embodiments or the flowchart, but may include more or fewer operation steps based on conventional or uncreative labor. The sequence of steps listed in the embodiments is only one of many execution sequences of steps and does not represent the only execution sequence. In an actual execution of a product of an autonomous driving control apparatus, it may be executed sequentially or in parallel (for example, a parallel processor or multi-threaded processing environment) according to the methods shown in the embodiments or the accompanying drawings. Specifically as shown in FIG. 1, the autonomous driving control system includes a control apparatus and an execution apparatus, the control apparatus including a main controller and a backup controller, the execution apparatus including main execution apparatuses and backup execution apparatuses, the main execution apparatuses at least including a main steering controller and a main braking controller, and the backup execution apparatuses at least including a backup steering controller corresponding to the main steering controller and a backup braking controller corresponding to the main braking controller. Specifically as shown in FIG. 5, the control method may include:

step S501: the backup controller receives a main control instruction sent by the main controller;

step S503: the backup controller decomposes the main control instruction to obtain backup control instructions corresponding to the backup execution apparatuses respectively;

step S505: the backup controller sends the backup control instructions to the backup execution apparatuses correspondingly;

step S507: the control system detects whether an abnormality occurs in any one device of the main execution apparatuses; and step S509: the control system controls, when detecting the above abnormality, the backup execution apparatus corresponding to the device in which the abnormality has occurred to execute a corresponding backup control instruction.

In a specific embodiment, the backup control instructions include a backup steering control instruction and a backup braking control instruction. The step that the backup controller sends the backup control instructions to the backup execution apparatuses correspondingly may include:

the backup controller sends the backup steering control instruction to the backup steering controller and the backup braking control instruction to the backup braking controller.

In a further embodiment, the step that the control system controls, when detecting the above abnormality, the backup execution apparatus corresponding to the device in which the abnormality has occurred to execute a corresponding backup control instruction may include:

the main steering controller sends, when the control system detects that an abnormality occurs in any one device of the main controller and the main steering controller, a first response control instruction to the backup steering controller, the first response control instruction being used for instructing the backup steering controller to respond to the backup steering control instruction;

the backup steering controller executes the backup steering control instruction on the basis of the first response control instruction;

the main braking controller sends, when the control system detects that an abnormality occurs in any one device of the main controller and the main braking controller, a second response control instruction to the backup braking controller, the second response control instruction being used for instructing the backup braking controller to respond to the backup braking control instruction; and the backup braking controller executes the backup braking control instruction on the basis of the second response control instruction.

In some other embodiments, the control method may further include:

the backup steering controller detects whether a control instruction of the main steering controller is received in a preset period;

if not, the backup steering controller responds to the backup steering control instruction; and the backup braking controller detects whether a control instruction of the main braking controller is received in a preset period;

if not, the backup braking controller responds to the backup braking control instruction.

In some other embodiments, the control method may further include:

the backup steering controller detects whether communication with the main steering controller is interrupted;

if so, the backup steering controller responds to the backup steering control instruction; and the backup braking controller detects whether communication with the main braking controller is interrupted;

if so, the backup braking controller responds to the backup braking control instruction.

Figure 6:
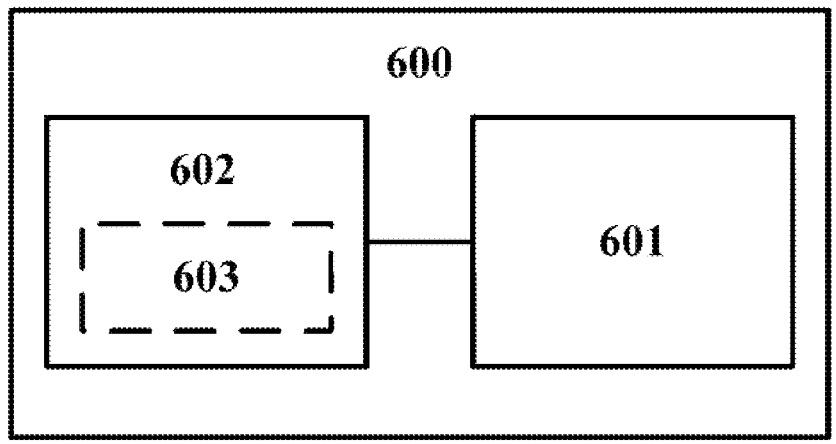
FIG. 6 is a structural diagram of a control device for an autonomous driving control system provided by an embodiment of the present invention.

The embodiments of the present invention further provide an autonomous driving control device (that is, a control device for an autonomous driving control system) 600. As shown in FIG. 6, the autonomous driving control device 600 includes a processor 601 and a memory 602, wherein the memory 602 stores at least one instruction, at least one program, a code set or an instruction set 603, and the at least one instruction, the at least one program, the code set or the instruction set 603 is loaded and executed by the processor 601 to implement any one of the control methods for an autonomous driving control system.

During performing the control method, the system or the device for an autonomous driving system provided by the embodiments of the present invention, in an implementation, when an abnormality occurs in any one device of the main controller, the main steering controller or the main braking controller, the backup steering control instruction is executed by the backup steering controller instead, and the backup braking control instruction is executed by the backup braking controller, thereby ensuring that an autonomous driving vehicle can still operate normally when the abnormality occurs in any one device of the main controller, the main steering controller or the main braking controller, achieving an ASIL D-level functional safety and reliability of autonomous driving.

In another implementation, when the abnormality occurs in any one device of the main execution apparatuses, a corresponding backup control instruction is executed by the backup execution apparatus corresponding to the device in which the abnormality has occurred, other main execution apparatuses can still respond to a main control instruction of the main controller. For example, when the abnormality occurs in the main steering controller, the backup steering controller will execute a corresponding backup control instruction, and the main braking controller may still respond to a main braking control instruction of the main controller to operate normally; and when the abnormality occurs in the main braking controller, the backup braking controller will execute a corresponding backup control instruction, and the main steering controller may still respond to a main steering control instruction of the main controller to operate normally, avoiding a situation that all the main execution apparatuses need to be switched to the backup execution apparatuses when the abnormality occurs in one main execution apparatus, thereby ensuring the timeliness and the precision of backup, and further ensuring the ASIL D-level functional safety and reliability of the autonomous driving.

It should be noted that the above sequence of embodiments of the present invention is only for description, and does not represent the advantages or disadvantages of the embodiments. In addition, specific embodiments of this specification have been described above. Other embodiments are within the scope of the appended claims. In some cases, the actions or steps recited in the claims may be performed in a different order from those in the embodiments and still achieve desired results. In addition, the processes depicted in the accompanying drawings do not necessarily require the particular order or sequential order shown to achieve the desired results. In some implementations, multitasking and parallel processing are possible or may be advantageous.

Embodiments in the specification are described in a progressive way, same and similar parts among the embodiments can refer to one another, and each embodiment focuses on differences from the other embodiments. In particular, for apparatus, terminal, and system embodiments, which are substantially similar to the method embodiments, the descriptions are relatively simple, and where relevant, reference can be made to partial descriptions of the method embodiments.

Those of ordinary skill in the art can understand that all or part of the steps for implementing the above embodiments may be completed by hardware or by a program instructing related hardware, and the program may be stored in a computer-readable storage medium, which may be a read-only memory, a magnetic disk, or an optical disc, etc.

The invention claimed is:

1. An autonomous driving control system, applied to a control device comprising a processor and a memory, the memory storing at least one instruction, at least one program, a code set or an instruction set, and the at least one instruction, the at least one program, the code set or the instruction set being loaded and executed by the processor, and the autonomous driving control system comprising a control apparatus and an execution apparatus, the control apparatus comprising a main controller and a backup controller, the execution apparatus comprising main execution apparatuses and backup execution apparatuses, the main execution apparatuses at least comprising a main steering controller and a main braking controller, and the backup execution apparatuses at least comprising a backup steering controller corresponding to the main steering controller and a backup braking controller corresponding to the main braking controller, wherein the backup controller is configured to decompose, when receiving a main control instruction from the main controller, the main control instruction to obtain backup control instructions corresponding to the backup execution apparatuses respectively, and send the backup control instructions to the backup execution apparatuses correspondingly; and the control system is configured to control, when detecting that an abnormality occurs in any one device of the main execution apparatuses, the backup execution apparatus corresponding to the device in which the abnormality has occurred to execute a corresponding backup control instruction, the backup control instructions comprise a backup steering control instruction and a backup braking control instruction; and the backup controller is further configured to send the backup steering control instruction to the backup steering controller, and send the backup braking control instruction to the backup braking controller, the backup steering controller is configured to respond to, when not receiving a control instruction of the main steering controller in a preset period, the backup steering control instruction; and the backup braking controller is configured to respond to, when not receiving a control instruction of the main braking controller in a preset period, the backup braking control instruction.

2. The autonomous driving control system according to claim 1, wherein the main steering controller is configured to send, when the control system detects that an abnormality occurs in any one device of the main controller and the main steering controller, a first response control instruction to the backup steering controller, the first response control instruction being used for instructing the backup steering controller to respond to the backup steering control instruction; and the main braking controller is configured to send, when the control system detects that an abnormality occurs in any one device of the main controller and the main braking controller, a second response control instruction to the backup braking controller, the second response control instruction being used for instructing the backup braking controller to respond to the backup braking control instruction.

3. The autonomous driving control system according to claim 2, wherein the main steering controller is further configured to send, when the control system detects that the abnormality occurs in any one device of the main controller and the main steering controller, the first response control instruction to the backup steering controller on the basis of a preset abnormal trigger condition; and the main braking controller is further configured to send, when the control system detects that the abnormality occurs in any one device of the main controller and the main braking controller, the second response control instruction to the backup braking controller on the basis of the preset abnormal trigger condition, the second response control instruction being used for instructing the backup braking controller to respond to the backup braking control instruction.

4. The autonomous driving control system according to claim 1, wherein the backup steering controller is configured to respond to, when detecting that communication with the main steering controller is interrupted, the backup steering control instruction; and the backup braking controller is configured to respond to, when detecting that communication with the main braking controller is interrupted, the backup braking control instruction.

5. The autonomous driving control system according to claim 1, wherein the control system is specifically configured to detect whether a failure occurs in any one device of the main controller, the main steering controller and the main braking controller, or whether communication interruption occurs in any one device of the main controller, the main steering controller and the main braking controller.

6. A control method for an autonomous driving control system, wherein the control system is applied to a control device comprising a processor and a memory, the memory stores at least one instruction, at least one program, a code set or an instruction set, and the at least one instruction, the at least one program, the code set or the instruction set is loaded and executed by the processor to implement the control method, the control system comprises a control apparatus and an execution apparatus, the control apparatus comprising a main controller and a backup controller, the execution apparatus comprising main execution apparatuses and backup execution apparatuses, the main execution apparatuses at least comprising a main steering controller and a main braking controller, and the backup execution apparatuses at least comprising a backup steering controller corresponding to the main steering controller and a backup braking controller corresponding to the main braking controller; and the method comprises:

receiving, by the backup controller, a main control instruction sent by the main controller;

decomposing, by the backup controller, the main control instruction to obtain backup control instructions corresponding to the backup execution apparatuses respectively;

sending, by the backup controller, the backup control instructions to the backup execution apparatuses correspondingly;

detecting, by the control system, whether an abnormality occurs in any one device of the main execution apparatuses; and controlling, by the control system when detecting the above abnormality, the backup execution apparatus corresponding to the device in which the abnormality has occurred to execute a corresponding backup control instruction, the backup control instructions comprise a backup steering control instruction and a backup braking control instruction; and the step of sending, by the backup controller, the backup control instructions to the backup execution apparatuses correspondingly comprises:

sending, by the backup controller, the backup steering control instruction to the backup steering controller and the backup braking control instruction to the backup braking controller, the control method further comprises:

detecting, by the backup steering controller, whether a control instruction of the main steering controller is received in a preset period;

if not, responding to, by the backup steering controller, the backup steering control instruction; and detecting, by the backup braking controller, whether a control instruction of the main braking controller is received in a preset period;

if not, responding to, by the backup braking controller, the backup braking control instruction.

7. The control method according to claim 6, wherein the step of controlling, by the control system when detecting the above abnormality, the backup execution apparatus corresponding to the device in which the abnormality has occurred to execute a corresponding backup control instruction comprises:

sending, by the main steering controller, when the control system detects that an abnormality occurs in any one device of the main controller and the main steering controller, a first response control instruction to the backup steering controller, the first response control instruction being used for instructing the backup steering controller to respond to the backup steering control instruction;

executing, by the backup steering controller, the backup steering control instruction on the basis of the first response control instruction;

sending, by the main braking controller, when the control system detects that an abnormality occurs in any one device of the main controller and the main braking controller, a second response control instruction to the backup braking controller, the second response control instruction being used for instructing the backup braking controller to respond to the backup braking control instruction; and executing, by the backup braking controller, the backup braking control instruction on the basis of the second response control instruction.

8. The control method according to claim 6, further comprising:

detecting, by the backup steering controller, whether communication with the main steering controller is interrupted;

if so, responding to, by the backup steering controller, the backup steering control instruction; and detecting, by the backup braking controller, whether communication with the main braking controller is interrupted;

if so, responding to, by the backup braking controller, the backup braking control instruction.

\* \* \* \* \*